(12) United States Patent
Park

(10) Patent No.: US 7,853,729 B2
(45) Date of Patent: Dec. 14, 2010

(54) METHOD AND APPARATUS FOR SELF-DIAGNOSING OF A SINGLE DEVICE THAT INCLUDES INTERNAL USB HOST AND USB CLIENT

(75) Inventor: Sang-hyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1480 days.

(21) Appl. No.: 11/119,813

(22) Filed: May 3, 2005

(65) Prior Publication Data

US 2005/0268175 A1 Dec. 1, 2005

(30) Foreign Application Priority Data

May 4, 2004 (KR) .................... 10-2004-0031328

(51) Int. Cl.
*G06F 11/00* (2006.01)
*G06F 13/00* (2006.01)

(52) U.S. Cl. .................... 710/15; 710/8; 710/9; 710/10; 710/16; 710/17; 710/18; 710/19; 710/33; 710/74; 714/25; 714/43; 714/724; 101/484

(58) Field of Classification Search ............. 710/8–10, 710/15–19, 33, 74; 714/25, 724, 34; 101/484
See application file for complete search history.

(56) References Cited

U.S. PATENT DOCUMENTS

| | | | |
|---|---|---|---|
| 4,864,599 A * | 9/1989 | Saegusa et al. ............. 455/411 |
| 6,609,461 B2 * | 8/2003 | Horii et al. .................. 101/484 |
| 6,895,539 B1 * | 5/2005 | Aragona ...................... 714/724 |
| 6,977,960 B2 * | 12/2005 | Takinosawa ................. 375/224 |
| 7,197,029 B1 * | 3/2007 | Osterhout et al. ........... 370/353 |
| 7,225,280 B2 * | 5/2007 | Moran ......................... 710/74 |
| 7,232,063 B2 * | 6/2007 | Fandel et al. ................ 235/383 |
| 2002/0133649 A1 | 9/2002 | Chu ............................ 710/62 |
| 2006/0052919 A1 * | 3/2006 | Hong et al. .................. 701/29 |

FOREIGN PATENT DOCUMENTS

| | | |
|---|---|---|
| JP | 2003-344499 | 12/2003 |
| JP | 2004-021459 | 1/2004 |
| KR | 1999-0043423 | 6/1999 |
| KR | 10-0251782 | 1/2000 |
| KR | 2003-0072980 | 9/2003 |
| KR | 2003-0094727 | 12/2003 |

* cited by examiner

*Primary Examiner*—Tammara Peyton
(74) *Attorney, Agent, or Firm*—Roylance, Abrams, Berdo & Goodman, LLP

(57) ABSTRACT

A method and apparatus for performing a self diagnosis of a device that includes a universal serial bus (USB) host and a USB client. The method includes detecting whether the universal serial bus client of the device is connected to a universal serial bus host, detecting whether the device acting as the universal serial bus client is identical to a device acting as the universal serial bus host when the universal serial bus client is connected to the universal serial bus host, and allowing the self diagnosis of the device to be automatically performed when the device acting as the universal serial bus client is identical to the device acting as the universal serial bus host. Accordingly, a self diagnosis of a device can be automatically performed by connecting a USB client to its USB host.

14 Claims, 3 Drawing Sheets

METHOD AND APPARATUS FOR SELF-DIAGNOSING OF A SINGLE DEVICE THAT INCLUDES INTERNAL USB HOST AND USB CLIENT

CROSS-REFERENCE TO RELATED APPLICATIONS

This application claims the benefit under 35 U.S.C. §119 (a) of Korean Patent Application No. 10-2004-0031328 filed in the Korean Intellectual Property Office on May 4, 2004, the entire disclosure of which is hereby incorporated by reference.

BACKGROUND OF THE INVENTION

1. Field of the Invention

The present invention relates to a self-diagnosing method and apparatus using a Universal Serial Bus (USB). More particularly, the present invention relates to a self-diagnosing method and apparatus that are applicable to a device that includes a USB host and a USB client.

2. Description of the Related Art

In general, a self test or self diagnosis of a device, such as a printer, requires a computer or a user interface of the device. When using the computer for the self-diagnosis, the computer connected to the printer gives a self-diagnosis command to the printer, and the printer transmits the result of self diagnosis to the computer so that it can be displayed on a monitor or printed out. When using the user interface of the printer, such as a button or a Liquid Crystal Display (LCD), the self diagnosis of the printer starts by pressing the button or selecting a self diagnosis item from a menu displayed on the LCD.

However, the use of the computer or the user interface of the printer may result in an inconvenience to the user, since a user must select a self diagnosis item from the computer or the user interface of the printer, such as from a menu displayed on an LCD. However, in general, a portable printer such as a photo printer has only a power button, and the inclusion of an additional self-diagnosis button may be impractical.

Meanwhile, the use of devices that include a Universal Serial Bus (USB) has become increasingly popular. In general, a computer acts as a USB host, and a device, such as a printer or a scanner, acts as a USB client. However, a device such as the photo printer may include both the USB host and the USB client. When the photo printer operates as the USB host, the photo printer may receive data from a memory card or a digital camera acting as the USB client.

As the use of these devices which include a USB has become increasingly popular, the self test or self diagnosis of such devices has also become of greater importance. A method and apparatus for testing a USB device is disclosed in U.S. patent publication No. 2002/0133649, the entire disclosure of which is hereby incorporated by reference. However, still further reductions in user inconvenience is required.

Accordingly, a need exists for a system and method for performing a self diagnosis of a device without the inconvenience caused when manually selecting a self diagnosis item from a computer or a user interface.

SUMMARY OF THE INVENTION

The present invention resolves the above and other problems, and provides a method of performing a self diagnosis of a device that includes a USB host and a USB client by connecting the USB client to the USB host.

The present invention also provides an apparatus for performing a self diagnosis of a device that includes a USB host and a USB client by connecting the USB client to the USB host.

According to one aspect of the present invention, a method of performing a self diagnosis of a device that includes a universal serial bus host and a universal serial bus client is provided, the method comprising the steps of (a) detecting whether the universal serial bus client of the device is connected to a universal serial bus host, (b) when the universal serial bus client is connected to the universal serial bus host, detecting whether the device acting as the universal serial bus client is identical to a device acting as the universal serial bus host, and (c) when the device acting as the universal serial bus client is identical to the device acting as the universal serial bus host, allowing the self diagnosis of the device to be automatically performed.

The method may further include the step of (d) outputting a result of the self diagnosis after step (c).

According to another aspect of the present invention, an apparatus for performing a self diagnosis of a device that includes a universal serial bus host and a universal serial bus client is provided, the apparatus comprising an access detector for detecting whether the universal serial bus client of the device is connected to a universal serial bus host, an identification detector for detecting whether the device acting as the universal serial bus client is identical to a device acting as the universal serial bus host when the universal serial bus client is connected to the universal serial bus host, and a self diagnosis unit for allowing the self diagnosis of the device to be automatically performed when the device acting as the universal serial bus client is identical to that device acting as the universal serial bus host.

The apparatus may further include an output unit for outputting a result of the self diagnosis.

BRIEF DESCRIPTION OF THE DRAWINGS

The above and other aspects and advantages of the present invention will become more apparent by describing in detail exemplary embodiments thereof with reference to the attached drawings in which.

Throughout the drawings, like reference numerals will be understood to refer to like parts, components and structures.

DETAILED DESCRIPTION OF EXEMPLARY EMBODIMENTS

Figure 1:
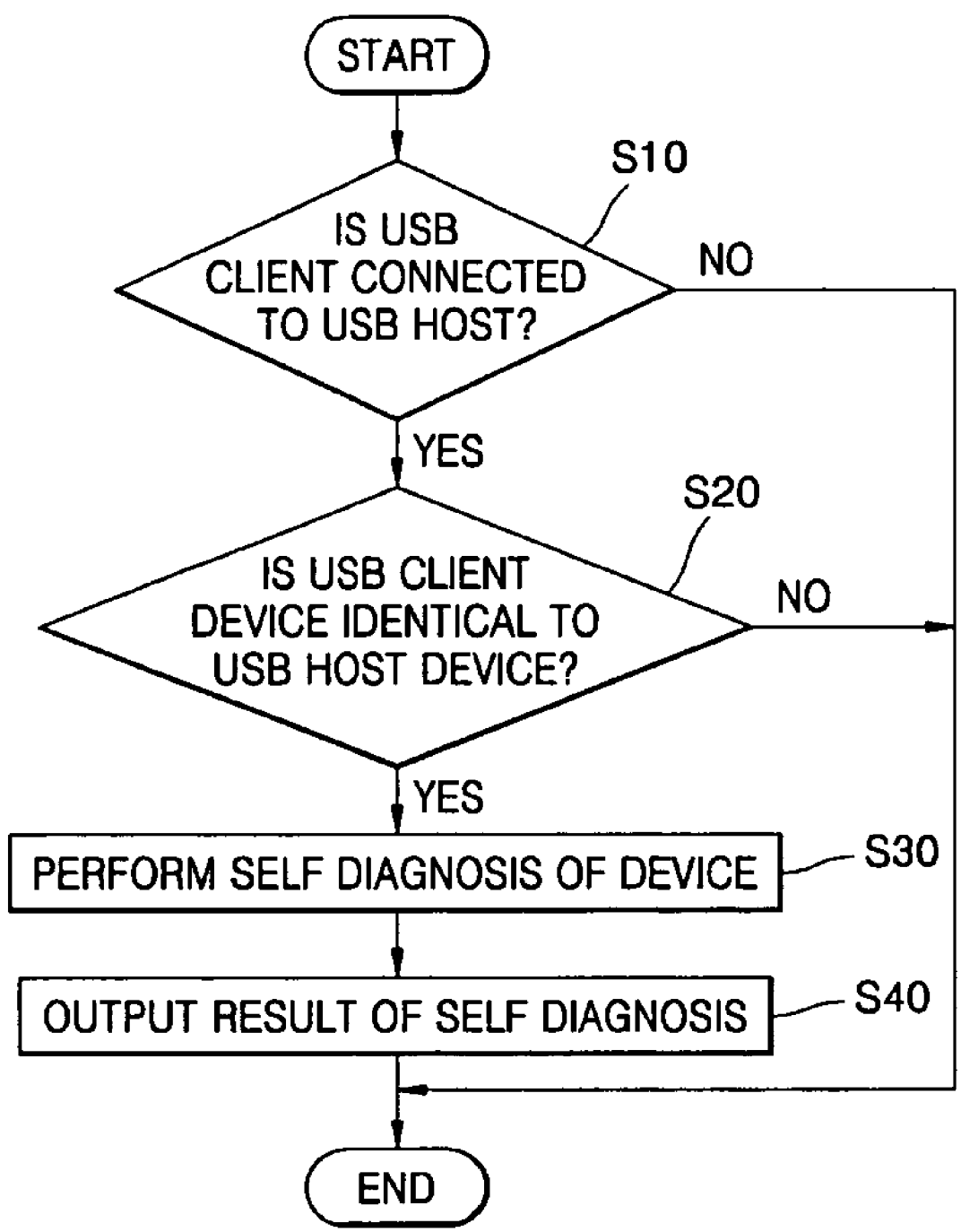
FIG. 1 is a flowchart of a self-diagnosis method according to an embodiment of the present invention.

Hereinafter, exemplary embodiments of the present invention will be described in detail with reference to the accompanying drawings. The same reference numerals are used to represent the same elements throughout the drawings.

Figure 2:
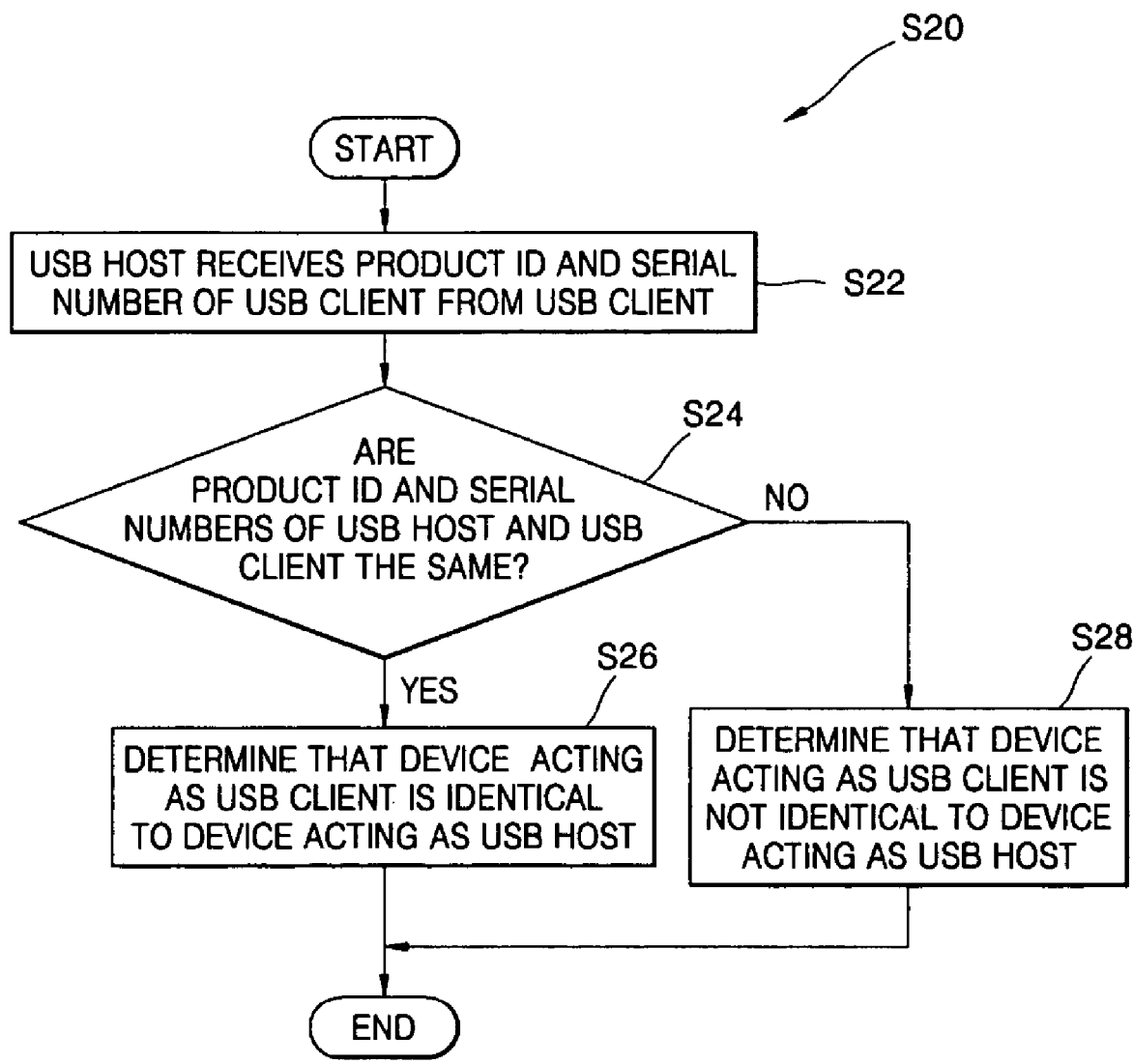
FIG. 2 is a detailed flowchart of operation S20 of FIG. 1 according to an embodiment of the present invention.
Figure 3:
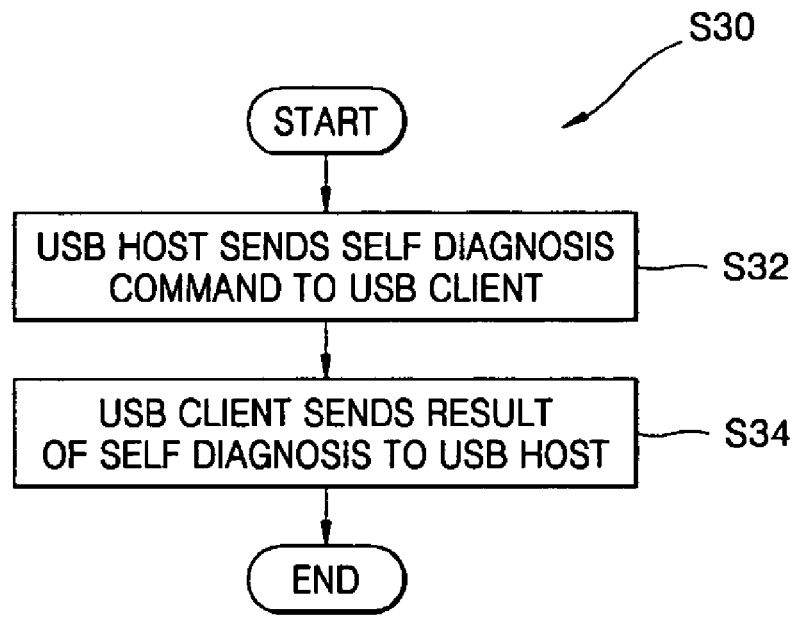
FIG. 3 is a detailed flowchart of operation S30 of FIG. 1 according to an embodiment of the present invention.

A self diagnosis method according to an embodiment of the present invention will now be described with reference to FIGS. 1 through 3. The self diagnosis method is performed by a device that includes a Universal Serial Bus (USB) host and a USB client. In the exemplary method, it is first determined whether the USB client is connected to a USB host in operation S10. If the USB client is not connected to the USB host, the method is completed.

If it is determined in operation S10 that the USB client is connected to the USB host, it is then determined whether the device acting as the USB client is identical to a device acting as the USB host in operation S20. When the device acting as the USB client is not the same as the device acting as the USB host, the method is completed.

If it is determined in operation S20 that the device acting as the USB client is the same as the device acting as the USB host, a self diagnosis of the device is automatically initiated in operation S30.

The result of self diagnosis is then output in operation S40. When the device is a printer, the result of self diagnosis may be printed out. If the device includes a Liquid Crystal Display (LCD) or a Light Emitting Diode (LED), the result of self diagnosis may be displayed thereon.

Operation S20 will now be described in greater detail with reference to FIG. 2. In operation S20, the USB host is first given the product identification (ID) and serial number of the USB client from the USB client in operation S22. Next, the product ID and serial number of the USB client are compared with those of the USB host in operation S24.

If the product ID and serial numbers are the same in operation S24, it is then determined that the device acting as the USB client is identical to the device acting as the USB host in operation S26. If the product ID and serial numbers are not the same in operation S24, the device acting as the USB client is determined to be different from the device acting as the USB host in operation S28.

Operation S30 will now be described in greater detail with reference to FIG. 3. In operation S30, the USB host first sends a self diagnosis command to the USB client using a predetermined protocol in operation S32. Next, in response to the command, the USB client sends the result of the self diagnosis to the USB host using the protocol in operation S34.

Here, the protocol may be a USB standard protocol or a protocol defined by a device manufacturer.

The device is preferably a printer, a facsimile, a multi-functional device, a copier, or a scanner, and more preferably, a photo printer. The multi-functional device is a device that typically has a function of at least one of a printer, a facsimile machine, a copier, and a scanner.

The result of the self diagnosis may specify at least one of the amount of ink left, files that have recently been printed, media access, and USB communications state.

Figure 4:
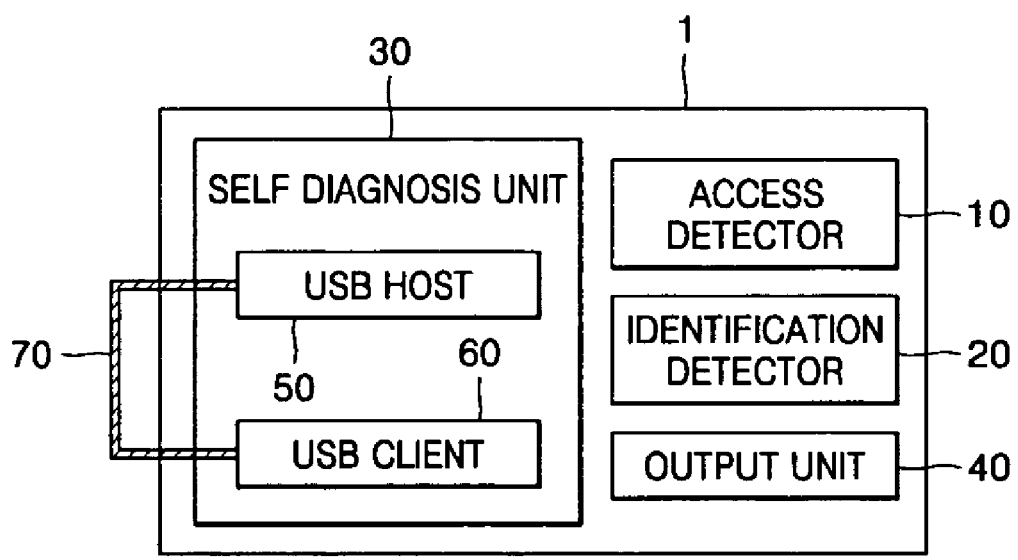
FIG. 4 is a block diagram of a self-diagnosis apparatus according to an embodiment of the present invention.

A self diagnosis apparatus will now be described in greater detail with reference to FIG. 4. FIG. 4 is a block diagram of an apparatus 1 for performing a self diagnosis of a device that includes a USB host 50 and a USB client 60, according to an embodiment of the present invention. The apparatus 1 may be included in the device or may be the device itself. The apparatus 1 includes an access detector 10, an identification detector 20, a self-diagnosis unit 30, and an output unit 40.

The access detector 10 detects whether the USB client 60 of the device is connected to a USB host 50. The identification detector 20 detects whether the device acting as the USB client is identical to a device acting as the USB host when the USB client 60 is connected to the USB host 50. When the device acting as the USB client is identical to the device acting as the USB host, a self diagnosis of the device is automatically performed by the self diagnosis unit 30. The output unit 40 then outputs the result of the self diagnosis.

If the device is a printer, the output unit 40 may print out the result of the self diagnosis. If the device has an LCD or an LED, the output unit 40 can output the result of the self diagnosis so that it can be displayed on the LCD or the LED.

Although FIG. 4 illustrates the identification detector 20 and the USB host 50 as separate elements, the USB host 50 may itself perform the function of the identification detector 20. When the USB host 50 acts as the identification detector 20, the USB host 50 receives the product ID and serial number of the USB client 60 from the USB client. Then, the USB host 50 compares its own product ID and serial number with those of the USB client 60. If their product ID and serial numbers are the same, the device acting as the USB client is determined to be identical to that acting as the USB host.

The self diagnosis unit 30 may include the USB host 50 and/or the USB client 60. When the USB host 50 is connected to the USB client 60 via a USB cable 70, the USB host 50 sends a self diagnosis command to the USB client 60 using a predetermined protocol. In response to the command, the USB client 60 sends the result of the self diagnosis to the USB host 50 using the protocol.

The protocol may be a USB standard protocol or a protocol defined by a device manufacturer. It is further possible to communicate between the USB host 50 and the USB client 60 using the USB standard protocol. However, the protocol defined by the device manufacturer is preferably used for communications between the USB host 50 and the USB client 60, since this protocol can define any number of various self diagnosis items and enable easier communication. Also, since the USB host 50 and the USB client 60 work within the same device, there are no particular problems with the use of the protocol defined by the device manufacturer.

The device is preferably a printer, a facsimile machine, a multi-functional device, a copier, or a scanner, and more preferably, a photo printer. The photo printer may include a USB host and a USB client. When the photo printer acts as the USB host, the photo printer can easily receive data from a memory card or a digital camera (not shown) acting as the USB client.

If the device is a printer or a photo printer, the result of the self diagnosis may specify at least one of the amount of ink left, files that have recently been printed, media access, and USB communications state. The USB communications state is determined by whether communications between the USB host 50 and the USB client 60 are successfully performed. That is, the USB communications state is determined to be satisfactory when the self diagnosis command is completely transmitted from the USB host 50 to the USB client 60, and the result of the self diagnosis is completely transmitted from the USB client 60 to the USB host 50.

As described above, the present invention is advantageous in that a self diagnosis of a device can be automatically performed by connecting a USB client and its USB host. Since the present invention does not require a computer or a user interface of a device, it is possible to reduce the inconvenience to a user that results from the requirement to manually select a self diagnosis item from the computer or the user interface. In particular, it is possible to make a self diagnosis of a compact device, such as a hand-held photo printer that has few user interface buttons, or that does not have a self diagnosis button.

Also, the connection of the USB client of the photo printer to its USB host in accordance with an embodiment of the present invention allows an automatic output of self diagnosis information regarding the amount of ink left, files that have recently been printed, access of a media, such as a memory card or a digital camera, to the photo printer, and information regarding the USB communications state.

While the invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of performing a self diagnosis of a single device that includes a universal serial bus host and a universal serial bus client, the method comprising the steps of:
   (a) detecting whether the universal serial bus client of the device is connected to the universal serial bus host, wherein the device comprises a function of at least one of a printer, a facsimile machine, a multi-functional device, and a scanner;
   (b) detecting whether the device acting as the universal serial bus client is identical to the device acting as the universal serial bus host when the universal serial bus client is connected to the universal serial bus host, wherein step (b) comprises the steps of:
      (b1) receiving product identification and serial number of the universal serial bus client at the universal serial bus host from the universal serial bus client;
      (b2) comparing product identification and serial numbers of the universal serial bus host and the received product identification and serial number of the universal serial bus client; and
      (b3) determining that the device acting as the universal serial bus client is identical to the device acting as the universal serial bus host when the product identification and serial number of the universal serial bus host and the product identification and serial number of the universal serial bus client are the same, respectively; and
   (c) directing the self diagnosis of the device to be automatically performed when the device acting as the universal serial bus client is identical to the device acting as the universal serial bus host.

2. The method of claim 1, further comprising the step of:
   (d) outputting a result of the self diagnosis after step (c).

3. The method of claim 2, wherein step (d) further comprises the step of:
   (d1) printing out the result of the self diagnosis.

4. The method of claim 2, wherein step (d) further comprises the step of:
   (d2) displaying the result of the self diagnosis on one of a liquid crystal display and a light emitting diode.

5. The method of claim 1, wherein step (c) further comprises the steps of:
   (c1) sending a self diagnosis command from the universal serial bus host to the universal serial bus client using a predetermined protocol; and
   (c2) sending the result of the self diagnosis from the universal serial bus client to the universal serial bus host in response to the self diagnosis command output from the universal serial bus host using the predetermined protocol.

6. The method of claim 5, wherein the predetermined protocol comprises one of a universal serial bus standard protocol and a protocol defined by a device manufacturer.

7. The method of claim 1, wherein the result of the self diagnosis comprises information regarding at least one of an amount of ink remaining in the device, files that have recently been printed, media access, and universal serial bus communications state.

8. An apparatus for performing a self diagnosis of a single device that includes a universal serial bus host and a universal serial bus client, the apparatus comprising:
   an access detector for detecting whether the universal serial bus client of the device is connected to the universal serial bus host, wherein the device comprises a function of at least one of a printer, a facsimile machine, a multi-functional device, a copier, and a scanner;
   an identification detector for detecting whether the device acting as the universal serial bus client is identical to the device acting as the universal serial bus host when the universal serial bus client is connected to the universal serial bus host, wherein the identification detector comprises:
      a first component for allowing the universal serial host to receive product identification and serial number of the universal serial bus client from the universal serial bus client;
      a second component for comparing product identification and serial numbers of the universal serial bus client and the received product identification and serial number of the universal serial bus host; and
      a third component for determining that the device acting as the universal serial bus client is identical to the universal serial bus host when the product identification and serial number of the universal serial bus client and the product identification and serial number of the universal serial bus host USB are the same, respectively; and
   a self diagnosis unit for allowing the self diagnosis of the device to be automatically performed when the device acting as the universal serial bus client is identical to the device acting as the universal serial bus host.

9. The apparatus of claim 8, further comprising an output unit for outputting a result of the self diagnosis.

10. The apparatus of claim 9, wherein the output unit is configured to print out the result of the self diagnosis.

11. The apparatus of claim 9, wherein the output unit is configured to display the result of the self diagnosis on at least one of a liquid crystal display and a light emitting diode.

12. The apparatus of claim 8, wherein the self diagnosis unit comprises the universal serial bus host and the universal serial client, wherein:
   the universal serial bus host is configured to send a self diagnosis command to the universal serial client using a predetermined protocol; and
   the universal serial bus client is configured to send a result of the self diagnosis to the universal serial bus host in response to the self diagnosis command output from the universal serial bus host using the predetermined protocol.

13. The apparatus of claim 12, wherein the predetermined protocol comprises one of a universal serial bus standard protocol and a protocol defined by a device manufacturer.

14. The apparatus of claim 8, wherein the result of the self diagnosis comprises information regarding at least one of the amount of ink remaining in the device, files that have recently been printed, media access, and universal serial bus communications state.

* * * * *